United States Patent Office 2,988,509
Patented June 13, 1961

2,988,509
SODIUM CHLORIDE-CALCIUM CHLORIDE COMPOSITIONS AND THEIR PREPARATION
Glenn C. Schilberg, Pittsburgh, Pa., assignor, by mesne assignments, to Pittsburgh Plate Glass Company
No Drawing. Filed Dec. 14, 1956, Ser. No. 628,229
5 Claims. (Cl. 252—70)

The present invention deals with novel compositions possessed of especially effective deicing properties and thus well suited for winter maintenance of roads and other icy surfaces. It further relates to methods of producing such compositions. More particularly, it is directed to unique compositions of sodium chloride and calcium chloride and to their preparation.

In the maintenance of icy surfaces, such as are encountered on roads during the winter, it has heretofore been recognized that the application of sodium chloride and/or calcium chloride serves to melt the ice. Of the two, calcium chloride provides the more efficient treatment being effective at substantially lower temperatures and acting more rapidly. Lately, the combined use of sodium chloride and calcium chloride is being considered. However, mere mixing of the two chlorides has not been altogether effective and efficient.

Among the objections to mere mixtures of the two chlorides is the inconvenience of providing the mixture and the lack of uniformity in the distribution of the chlorides in the mixture. Another disadvantage of mere mixtures of calcium chloride and sodium chloride is the inefficient and inconsistent deicing results encountered during use.

According to this invention, a novel composition of calcium chloride and sodium chloride is provided which obviates or substantially minimizes the disadvantages of mere mixtures of the two chlorides. These novel compositions offer additional advantages including increased effectiveness as deicing agents and enhanced deicing on a weight basis by comparison with mere mixtures. Whereas in mere mixtures, the respective chlorides tend to separate and act independently, the present compositions apparently provide a synergistic effect of combined action of the chlorides.

It now has been discovered that the above advantages may be realized by use of a low bulk density, particulate composition containing calcium chloride and sodium chloride in intimate contact and well distributed, if not for practical purposes uniformly distributed, therein. Bulk densities of these compositions range from about 25 or 30 pounds per cubic foot to about 50 pounds per cubic foot, and most frequently are from 30 to 45 pounds per cubic foot. In this respect, they are of exceptionally low bulk density, and are lower in bulk density than mere mixtures of the two chlorides in the normal form they are marketed. Water may be present in the composition to the extent of up to about 6 percent by weight of the composition, although more usually no more than 0.1 to 3 percent (and even no water) is present.

These compositions contain the respective chlorides in the weight ratio of 0.5 to 5 parts of sodium chloride per part of calcium chloride. In most instances, the ratio is from 1 to 4 parts of sodium chloride per part of calcium chloride. Depending upon the particular climatic conditions under which the composition is to be used for deicing, the ratio of chlorides is varied within these limits. The colder the climatic conditions, the greater the proportion of calcium chloride. With particularly cold conditions, the composition may contain one part of calcium chloride per part of sodium chloride.

The composition is comprised of individual, distinct, small porous particles, each of which individually contains in intimate association and well dispersed therethrough the calcium chloride and sodium chloride. Each particle contains the chlorides in the same or essentially the same ratio they are present in the composition which is comprised of the particles. And the water content of each particle usually approximates the water content of the composition.

It will be understood that while ideally the individual particles comprising the composition are uniform in chloride ratio and water content, there may be some variation from particle to particle. A normal distribution with regard to these variants in each particle which provides a composition of the desired overall properties suffices.

In the form the composition is used with most facility and effectiveness for deicing and road maintenance, the particles are of such size that they pass through a 3/8 inch sieve. It is of further advantage for the particles to be so sized that at least 80 percent by weight pass through a No. 4 sieve and no more than 10 percent by weight pass through a No. 20 sieve. However, the particles may be even larger and up to one inch in any dimension.

Particles that comprise the composition evidence sufficient strength to resist substantial disintegration during normal shipping and handling prior to actual use.

The composition is hygroscopic and tends to pick up water unless stored under anhydrous conditions until its use. It has, however, been found that the composition may be stored in bulk in bins such as are employed for other deicing materials without substantially deteriorating its properties. When stored in this manner in a moist atmosphere, the stored material develops a moisture barrier on its exposed surfaces of but limited depth and the balance of the composition is unaffected.

According to a further embodiment of this invention, a novel process has been discovered which provides the hereinbefore described particulate, porous, low density calcium chloride-sodium chloride composition. It has now been found that such composition may be prepared by forming a mixture of sodium chloride and calcium chloride in the weight ratio of from 0.5 to 5 parts sodium chloride per part of calcium chloride containing between 7 and 15 percent water by weight of the wet mixture, establishing the temperature of the wet mixture such that it is plastic, e.g. a temperature of at least about 25° C., notably 40° C. to 140° C., and extruding or otherwise mechanically shaping or forming the plastic composition into small particles predominantly of the desired size. After forming the individual particles, the composition is dried as by heating to remove at least a portion of the water, as for example, to lower the water content thereof below 6 percent by weight, and more ideally to reduce it to below about 3 percent by weight.

It has been found that essential to the preparation of the desired composition according to this process is the establishment of a critical water concentration in the mixture prior to extruding or other shaping and drying the composition. Mixtures of sodium chloride and calcium chloride having an adjusted water content of between 7 and 15 percent by weight of the wet mixture, more preferably 8 to 12 percent by weight, and ideally about 10 percent, when gently heated usually to at least 40° C. and below 140° C. become plastic. That is, by establishing the temperature of the wet mixture within this range, the mixture becomes doughy, tacky and putty-like. In this form, it is readily extruded, or otherwise shaped or formed into small particles.

Should calcium chloride be employed which contains water of hydration, this water is taken into account as part of the requisite overall concentration.

Besides being critical to the formation of the plastic, extrudable or otherwise workable composition, the establishment of a 7 to 12 or possibly 15 percent water content in the wet mixture makes it possible to prepare a firm, hard product of exceptional uniformity and porosity.

After extruding or otherwise shaping the wet plastic mix into small particles, the particles are treated to reduce their water content at least below 6 percent by weight, or more aptly to from 0.1 to 3 percent by weight. A highly porous, low bulk density particulate, uniform product results which does not easily disintegrate. Both uniformity and porosity contribute to the deicing effectiveness of the product.

The manner of drying and temperatures attained during drying are susceptible of considerable latitude. Temperatures of drying air (when air drying is used) range from 100° C. to 800° C. by way of illustration. The drying time also varies depending upon the drying temperature and original moisture content. These variables are correlated such that the moisture level in the dried product after it reaches atmospheric temperatures (e.g., after it has cooled down) is below about 6 percent by weight, and more preferably, on the order of 0.1 to 3 percent.

The following examples illustrate the manner in which the present invention may be practiced:

EXAMPLE I

Two pounds of sodium chloride (as electrolytic salt) and 0.66 pound of flake calcium chloride (80 percent calcium chloride by weight) were blended in a single blade ribbon mixer. To this was added 0.21 pound of water during mixing. This, combined with the water present in the calcium chloride, established a water concentration of 11.9 percent by weight of the wet mixture.

The resulting mixture was warmed gently to 45° C. Upon warming, the mixture became plastic and putty-like. This plastic, putty-like mixture was then extruded into thin ribbons of product of between ¼ and ½ inch diameter. These ribbons were cut into particles of ¼ to ½ inch in diameter and less than one inch long. Thereafter, they were gently dried in warm air at 110° C. to remove a substantial portion of the water content. A porous product resulted in which the respective chloride salts were well dispersed.

EXAMPLE II

Two pounds of sodium chloride and 0.75 pound of calcium chloride as 78 percent by weight calcium chloride (balance as water) were mixed in a steam jacketed mixer. Steam at 20 pounds per square inch was fed to the jacket. After thorough mixing, 0.15 pound of water was added and mixing was continued for 15 minutes. The water content of this wet mixture was 10.8 percent by weight of the wet mixture.

This mixture at 49° C. and in a plastic state was forced through a ½ inch mesh screen and then dried in an oven at 110° C. overnight. The dried particulate material contained 2.9 percent water by weight and by screen analysis had a particle size distribution as follows:

| Screen No.: | Percent by weight on screen |
| --- | --- |
| 3 | 6.75 |
| 4 | 16.05 |
| 8 | 32.80 |
| 16 | 32.00 |
| 28 | 8.42 |
| Pan | 3.98 |

EXAMPLE III

Some 2.08 pounds of sodium chloride (containing 5 percent by weight water) and 0.66 pound of calcium chloride containing 78 percent by weight calcium chloride and the balance as water were mixed for 10 minutes. The water content of this wet mixture was 9.1 percent by weight.

In a plastic state this mixture was forced through a No. 4 mesh screen and thereafter dried in an oven at 107° C. The bulk density of the plus 8 mesh material was 37.4 pounds per cubic foot.

EXAMPLE IV 2.20 pounds of sodium chloride containing 5.85 percent water by weight and 0.66 pound of calcium chloride of 78 percent calcium chloride by weight (balance water) were mixed for 5 minutes in a mixer jacketed with 20 pounds per square inch steam. The wet mixture contained 9.55 percent water by weight thereof.

This plastic mass was forced through a No. 4 screen and then oven dried at 107° C. to a final water content of 2.1 percent by weight. By screen analysis, the product had this particle size distribution:

| Screen No.: | Percent by weight on screen |
| --- | --- |
| 3 | 0 |
| 4 | 7.0 |
| 8 | 23.8 |
| 16 | 43.2 |
| 28 | 13.5 |
| Pan | 12.5 |

The bulk density of the plus 8 mesh material was 33.3 pounds per cubic foot.

EXAMPLE V 2.20 pounds of sodium chloride containing 5.85 weight percent water and 0.66 pound of calcium chloride containing 78 percent by weight calcium chloride (balance water) were mixed for 5 minutes in a mixer jacketed with atmospheric steam. To this 0.7 pound of water were added and the wet mixture containing 11.7 percent water by weight was mixed for 3 minutes.

This plastic mixture was forced through a No. 4 screen and the resulting particles oven dried at 107° C. for 18 hours yielding a porous, particulate, low bulk density homogeneous composition.

EXAMPLE VI

At the rate of approximately 600 pounds per hour, electrolytic sodium chloride containing negligible moisture and 290 pounds per hour of a hot calcium chloride solution of 69 weight percent calcium chloride (the balance water) are fed to a pug mill where the mixture is mixed. The calcium chloride solution is fed at 154° C. to 171° C. In the mixer, the contents are at between 100° C. and 110° C. and are as a plastic mass which contains between 8 and 10 percent water by weight.

This warm plastic mass is extruded by an auger section connected to the pug mill where it is forced through a No. 4 mesh screen (with square openings 0.178 inch wide and 50.7 percent free area). The extruded product is then fed by conveyor belt through a drying chamber through which hot air mixed with flue gases from a gas fired heater are passed. These gases enter the drying chamber at 482° C. to 538° C. and leave at 93° C. to 149° C.

The solids leave the drying chamber at about 200° C. and contain between 1 and 6 percent water by weight. Even after leaving the drying chamber, additional water leaves the solids.

Thereafter the solids are crushed and screened. The oversize fraction is returned to the crushing operation and the fines are returned to the mixer. These fines usually contain a higher sodium chloride-calcium chloride ratio than the bulk of the product. Hence, the product from continuous operation varies somewhat in the ratio of salts it contains.

With the above operation, a product was prepared which contained 1 to 5 weight percent water, had a bulk density of 40 pounds per cubic foot and contained from 1.7 to 2.5 parts sodium chloride per part of calcium chloride. The particles were of such size that they all passed through a ⅜ inch screen, less than 20 weight percent were retained on a 4 mesh screen and less than 10 percent passed through a 20 mesh screen.

To demonstrate the superior deicing properties of the herein defined composition, tests were conducted to show the rate of ice penetration and depth of ice penetration achieved by such composition and mere mixtures of the two chlorides. Table I lists the findings:

*Table I*

ICE PENETRATION IN 1/32 OF AN INCH AT 15° F.[1]

| Time in Minutes | Products Produced in Accordance with Example VI | | Mixtures | | |
|---|---|---|---|---|---|
| | A | B | C | D | E |
| 5 | 10.6 | 9.6 | 8.9 | 8.4 | 8.9 |
| 10 | 17.6 | 17.0 | 14.1 | 14.2 | 13.6 |
| 15 | 21.3 | 21.2 | 15.8 | 16.8 | 17.6 |
| 30 | 29.6 | 30.3 | 15.9 | 17.2 | 19.6 |
| 45 | 31.1 | 32.6 | 15.9 | 17.2 | 19.7 |

[1] Data represents the average of a multitude of individual ice penetration tests.

Sample A had an NaCl/CaCl$_2$ ratio of 1.94 to 1 and contained 2.1 percent water.

Sample B had an NaCl/CaCl$_2$ ratio of 2.15 to 1 and contained 5.3 percent water.

Sample C was prepared by mixing rock salt and 78 percent calcium chloride in the ratio of 2 to 1.

Sample D was prepared by mixing rock salt and anhydrous calcium chloride in the ratio of 2 to 1.

Sample E was prepared by mixing electrolytic sodium chloride and 78 percent flake calcium chloride in the ratio of 2 to 1.

As the data in Table I shows, products of this invention penetrated ice at a faster rate and to a greater depth than did mere mixtures of calcium chloride and sodium chloride.

It will be appreciated that sodium chloride in the forms it is commercially available is suitable. Thus, rock salt or electrolytic salt (sodium chloride from electrolytic cells employed in the preparation of chlorine and caustic) and other common forms of sodium chloride are suitable. If the sodium chloride contains some water (but not enough to establish a water content in the chloride mix which exceeds the specified maximum), it may be used, taking into account the water so added to the chloride mixture. Calcium chloride may be used which does not include water in excess of the total quantity to be employed in the provision of the mixture of chlorides for extruding or other shaping procedure. Thus, flake calcium chloride as it is commercially offered to the trade is suitable. This form of calcium chloride comprises about 78 to 80 percent by weight of calcium chloride with the balance being water of crystallization.

It is possible to employ an aqueous calcium chloride liquor, the strength of which is such that in the final mix the water present with the calcium chloride will be adequate to provide the 7 to 12 or 15 percent water concentration. For example, when 3 parts by weight of sodium chloride are mixed with 1 part by weight of 65 percent calcium chloride liquor, a composition results which upon heating forms a plastic, extrudable mixture.

In performing this process, it is sometimes advantageous to employ hot solutions of the calcium chloride in forming the wet mixture of chlorides. This is especially true when the water content of the calcium chloride is such that it would be solid at room temperature. Often the heat made available to the wet mixture by this hot solution is sufficient to provide a putty-like, plastic mass capable of being extruded or otherwise shaped.

While the present invention has made specific reference to extrusion, it will be appreciated that any mechanical technique for forming or shaping the plastic, putty-like mass into essentially homogeneous, porous particles is suitable. Furthermore, while reference has been made to the formation of particles having a maximum dimension not in excess of one inch and more particularly particles of less than 3/8 inch, the present process is equally applicable to the preparation of compositions comprised of either considerably smaller or larger particles. These detailed sizes are particularly adaptable for use in most of the present apparatus available for winter maintenance of highways and hence are preferred. It is not necessary to prepare particles of the preferred size directly in the extrusion or like step. Large particles can be extruded and thereafter broken or cut to the desired size.

The present application is a continuation-in-part of my prior application Serial No. 556,045, filed December 29, 1955, and now abandoned.

Although the present invention has been described with reference to specific details of certain embodiments, it is not intended that the invention be construed as limited thereto except insofar as such limitation appear in the appended claim.

I claim:

1. The method which comprises forming a mixture of 0.5 to 5 parts of sodium chloride per part of calcium chloride by weight and containing a water concentration of from 7 to 15 percent by weight of the wet mixture, establishing the wet mixture at a temperature of at least 25° C., rendering the mixture plastic, forming the plastic mixture into particles and drying the particles to reduce their water content below 6 percent by weight.

2. The method which comprises forming a mixture of 0.5 to 5 parts of sodium chloride per part of calcium chloride by weight containing a water concentration of from 7 to 12 percent by weight of the wet mixture, establishing the wet mixture at a temperature of at least 25° C. which renders it plastic, forming the plastic mixture into particles and heating the particles to reduce their water content below 6 percent by weight.

3. The method which comprises forming a mixture of 0.5 to 5 parts of sodium chloride per part of calcium chloride by weight containing between 7 to 15 percent water by weight of the mixture, establishing the temperature of this wet mixture at 40° C. to 140° C. whereby to render the mixture plastic, mechanically forming the plastic mixture into particles, thereafter drying the particles to reduce their water content below 6 percent by weight.

4. A low bulk density, particulate sodium chloride-calcium chloride composition having a bulk density of 25 to 50 pounds per cubic foot and less than 6 percent by weight water, the water soluble solid components of which consist essentially of sodium chloride and calcium chloride in the weight ratio of 0.5 to 5 parts sodium chloride per part calcium chloride, said composition comprised of individual small porous particles each of which on an anhydrous basis consists essentially of calcium chloride and sodium chloride in intimate contact.

5. A particulate composition the normally solid water soluble components of which consist essentially of 1 to 4 parts sodium chloride per part of calcium chloride by weight of 30 to 45 pounds per cubic foot bulk density, said composition comprised of porous particles of less than one inch which on an anhydrous basis consisting essentially of sodium chloride and calcium chloride in intimate contact, and having less than 6 percent water by weight.

References Cited in the file of this patent

UNITED STATES PATENTS

| | | |
|---|---|---|
| 1,141,446 | De Ceu | June 1, 1915 |
| 1,825,151 | Keoleian | Sept. 29, 1931 |
| 1,968,195 | Fleischer | July 31, 1934 |
| 1,985,632 | Fleischer | Dec. 25, 1934 |
| 2,026,121 | Collings | Dec. 31, 1935 |
| 2,410,910 | Wait | Nov. 12, 1946 |

FOREIGN PATENTS

| | | |
|---|---|---|
| 759,666 | Germany | Oct. 2, 1952 |